United States Patent [19]

Liepa

[11] Patent Number: 4,537,783

[45] Date of Patent: Aug. 27, 1985

[54] CONTROL OF PARTICLE SIZE DISTRIBUTION DURING CONTINUOUS HEAT-SETTING OF MEAT ANALOG

[75] Inventor: Alexander L. Liepa, Montgomery, Ohio

[73] Assignee: The Procter & Gamble Company, Cincinnati, Ohio

[21] Appl. No.: 486,612

[22] Filed: Apr. 20, 1983

[51] Int. Cl.³ .............................................. A23J 3/00
[52] U.S. Cl. .................................. 426/243; 426/574; 426/656; 426/657; 426/802
[58] Field of Search ............... 426/104, 574, 656, 802, 426/243

[56] References Cited

U.S. PATENT DOCUMENTS

| | | | |
|---|---|---|---|
| 3,840,679 | 10/1974 | Liepa et al. | 426/802 X |
| 3,953,611 | 4/1976 | Youngquist | 426/656 X |
| 3,962,335 | 6/1976 | Kumar | 426/574 |
| 3,962,481 | 6/1976 | Kumar | 426/574 |
| 3,999,474 | 12/1976 | Sienkiewicz et al. | 99/467 |
| 4,021,584 | 5/1977 | Rankowitz | 426/802 X |
| 4,132,809 | 1/1979 | Desrosier | 426/656 X |
| 4,162,332 | 7/1979 | Sienkiewicz et al. | 426/249 |
| 4,166,138 | 8/1979 | Ziminski et al. | 426/249 |
| 4,265,917 | 5/1981 | Fabre | 426/104 |
| 4,298,628 | 11/1981 | Nagata et al. | 426/656 |
| 4,447,461 | 5/1984 | Loos et al. | 426/802 X |

FOREIGN PATENT DOCUMENTS 1018389 10/1977 Canada .
7343622 12/1973 Japan .

*Primary Examiner*—Robert Yoncoskie
*Attorney, Agent, or Firm*—Rose Ann Dabek; Gary M. Sutter; Richard C. Witte

[57] ABSTRACT

A process for controlling the particle size distribution of a particulate meat analog formed from a wet, agglomerated textured protein during continuous heat-setting of the protein is disclosed. The improvement in the continuous heat-setting, preferably by continuous frying, of textured protein comprises feeding the wet agglomerate as particles to the heat source, e.g. a fryer, as a continuous layer of constant bulk density and thickness. The agglomerate is placed on a continuous belt within the heating unit via a feed belt. The particle size distribution of the wet analog and thus the heat-set analog is controlled by the ratio of the continuous heat-setting unit belt to the feed belt speeds.

13 Claims, No Drawings

CONTROL OF PARTICLE SIZE DISTRIBUTION DURING CONTINUOUS HEAT-SETTING OF MEAT ANALOG

TECHNICAL FIELD

This invention is an improvement on a continuous heat-setting method for textured protein materials. The improvement comprises a means of controlling the particle size distribution of the textured protein product by control of the means of feeding the textured protein product through the heat-setting unit.

BACKGROUND OF THE INVENTION

Textured protein materials which simulate meat, i.e. meat analogs, are well known in the art. These materials have been available for several decades. Meat analogs are prepared by texturizing a protein source such as a vegetable protein, single cell proteins, mixtures of vegetable protein and meat, keratin and other protein sources. The textured product is prepared by extrusion cooking, by protein fiber formation, spinning, or by shaping the protein. The small particles of textured protein are often agglomerated, i.e. held together by a binder such as egg white, to prepare a simulated meat product. The binder is usually heat-set. Various methods have been proposed for heat setting proteins, and in some cases for texturizing, the protein.

Frying is one mode of heat setting textured vegetable protein meat analogs and shaped protein products. See for example, U.S. Pat. No. 3,950,550, issued to Katayama, 1976, which discloses fried tofu product. Tofu is kneaded and shaped either as a sheet or extruded into various forms. The product is then automatically fried at two different temperatures, the first stage at 100° C. to 135° C., and the second stage at 135° C. to 200° C.

Other hydrated vegetable protein materials are fried in a continuous mass. Small particles are obtained from this mass. See for example, U.S. Pat. No. 3,962,335 and U.S. Pat. No. 3,962,481, issued to Kumar, 1976.

Bacon-like analog products are made from two protein doughs which are co-extruded and then fried. Patents related to bacon analogs are U.S. Pat. No. 3,999,474 issued to Sinkovitch et al, 1976 and U.S. Pat. No. 4,166,138 issued to Ziminski et al, 1979. Frying also reduces the off-flavor of textured soy protein products. An expanded soy isolate product was extruded and then fried to reduce both the sulfur and bitter protein flavors (Canadian Pat. No. 1,018,389 issued to Graham et al, 1977).

None of these patents, however, discloses a method for controlling the particle size of the analog as it is continuously fed into the fryer. The prior art products are pressed analog or previously shaped analog which are either reduced in size after frying or used in the form in which it emerges from the fryer.

It has been found that the particle size distribution of the meat analog, particularly when it is used as a replacement for ground beef in a sauce, should not be of a uniform size distribution. Consumers prefer a particle size distribution which includes fine, small, medium particles, and large particles. It is difficult to obtain this particle size distribution in a continuation fryer because the wet agglomerate has to be broken up into discrete particles before or during frying. These same problems occur when the textured protein is heat-set using microwave energy or radiant heat, as in a continuous oven.

The object of the present invention therefore is to provide an improved continuous frying method for textured protein wherein the particle size of the textured protein is controlled to produce a meat analog having a particle size distribution ranging from fine to large particles.

It is also an object of this invention to provide a method for continuously forming an agglomerated textured protein in a layer, the agglomerate layer having a constant bulk density and thickness, and then transferring this layer onto a continuous belt as discrete random size particles which may or may not be in contact with one another as chance dictates. The continuous belt then passes through a heat source to heat-set the analog particles.

These and other objects will become apparent from reading the description which follows.

All percentages are by weight unless otherwise disclosed.

DESCRIPTION OF THE INVENTION

A process for forming discrete particles and for controlling particle size distribution of a meat analog during continuous heat-setting comprising depositing an agglomerated texturized protein extrudate from a feeder surface onto a continuous heat-setting conveyor, the improvement comprising forming the agglomerate on a moving surface in a continuous layer having a bulk density of from 0.45 g/cc to about 0.80 g/cc at a thickness of about 0.3 cm to about 3.5 cm, and then transferring the agglomerate layer to a conveyor traveling through the heat-setting zone, the heat-setting conveyor surface speed to the feeder surface speed being from about 1.1:1 to about 5:1.

The control of the bulk density and thickness is important for producing a heat-set or fried product of constant density. The ratio of conveyor surface speeds provides the particle size distribution range, i.e. produces particles of agglomerate ranging from fine to large.

DETAILED DESCRIPTION OF THE INVENTION

As used herein, the term "heat-setting conveyor" and "continuous heater belt" refer to the means by which the analog particles are transported through the heat source. This heat-setting conveyor can be a continuous stainless steel band, either solid or mesh, which carries the particles through a continuous fryer or through a radiant oven. It can also be a non-metallic belt or other means for passing the agglomerate through a microwave oven.

The means for heat-setting includes frying and heating which microwave energy or radiant heat as in a convection or radiant oven. The preferred mode of heat-setting the meat analog agglomerate is by frying the agglomerate in a vegetable or animal fat or oil or mixtures thereof. The type of fat or oil used is not critical to the invention.

The terms "meat analog" and "textured protein" simulating loose cooked ground meat are intended to include textured protein materials, well known to the art. The terms include mixtures of textured vegetable protein materials with up to 70%, but preferably less than 50%, of materials of animal origin, including egg albumen, meat, meat juices, serum, blood, meat by-products, hydrolyzed animal protein, and the like. Textured protein material from other than vegetable sources, such as single cell proteins and keratin can also be used herein.

By "agglomerate" herein is meant a textured protein material of varying particle size which is produced by mixing together in an aqueous slurry small particles or fibers of a textured protein source along with a binder material such as egg albumen, soy protein isolate, cottonseed protein isolate, and other binders known in the art. These binders usually are heat-set or denatured at temperatures of from about 90° C. (190° F.) to 160° C. (320° F.). The detailed description that follows is primarily directed to this preferred method of continuous frying. One skilled in the art will recognize and easily adapt this method to continuous heat-setting in a convection oven or microwave oven.

It has been discovered that consumers have an organoleptic preference for meat sauces in which the meat particles, or particles simulating meat, have a rather broad particle size distribution, including substantial percentages of both relatively large, and relatively fine particles, which reinforce a "meaty" organoleptic impression.

A sauce containing at least about 7% by volume of textured protein simulating loose cooked ground meat, the textured protein having a particle size distribution of (a) from 0% to about 2% by weight on a 15.9 mm screen; (b) from about 6% to about 20% by weight on a 12.7 mm screen, (c) from about 9% to about 18% by weight on a 9.51 mm screen; (d) from about 27% to about 37% by weight on a 5.66 mm screen; and (e) from about 25% to about 40% by weight through a 4.76 mm screen, provided that the sum of (a), (b), (c) and (d) is from about 48% to about 72%.

A preferred product in accordance with this invention is a sauce containing at least about 21% by volume textured vegetable protein simulating meat, the textured vegetable protein having a particle size distribution of (a) all particles through a 15.9 mm screen; (b) about 14% on a 12.7 mm screen; (c) about 15% on a 9.51 mm screen; (d) about 33% on a 5.66 mm screen, and (e) about 30% through a 4.76 mm screen.

It should be understood that these percentage distributions need not account of 100% of the analog in the sauce. In particle, it has been determined that the percentage of "intermediate" particles, i.e., those passing through a 5.66 mm screen and retained on a 4.76 mm screen, is relatively unrelated to consumer preferance and perception of meatiness. Where the total weight percent of particles in the specified size ranges is not 100%, it is intended that the balance is this "on 4.76 mm" fraction.

One skilled in the art will understand that the screen openings are standard mesh screens. The actual measured openings can vary. For example, a 15.9 mm screen may actually measure between 15.7 mm and 16.1 mm.

In a preferred process of this invention, a meat analog is prepared by (1) extrusion cooking a vegetable protein concentrate, e.g. soybean protein, to make an extrudate, and (2) comminution of the extrudate into particles smaller than normal fried chunks of ground meat. Other extrudates, bundles of protein fibers or textured sheeted proteins also can be used. At this point, the extrudate is preferably subjected to an agglomeration process, in which large meat analog particles are made from smaller components by mixing or coating the smaller particles with any of the variety of proteinaceous binders known to the art, along with colors and flavors, if desired, and then heat-setting the binder. These binders include egg white, soy protein fractions, cottonseed proteins and the like. In the practice of this invention, the heat setting step is accomplished by an improved continuous frying or heat-setting step.

The agglomerate has a moisture level of 60% to 74%, and preferably 62% to 73%.

Continuous frying methods include techniques whereby analog is distributed along an endless belt which is immersed in heated frying oil for at least a portion of its travel, prior to removal of the fried analog particles. Frying oil temperatures are usually between 220° F. (104° C.) and 320° F. (160° C.). The temperatures can drop during frying due to evaporative cooling to as low as 214° F. (101° C.). In a continuous frying process of a stream of particles of random size, the particles will cook to different degrees, and to different levels of binder setting, depending upon relative surface area-to-volume ratio of the particles.

In order to achieve the desired particle size distribution in a continuous frying, and to maintain the agglomerate within a specific density range, it has been discovered that the unheat-set agglomerate must be placed on the belt of the continuous fryer as discrete particles of varying sizes. This is done by forming a continuous layer of agglomerate having a specific density and thickness on a feeder belt and then transferring this agglomerate layer to a continuous belt (conveyor surface) for heat-setting. The ratio of the surface speeds of the two conveyors controls the particle size distribution.

A continuous layer of specific density and thickness is achieved by placing a specific amount of the agglomerate on a specific area on a feeder belt. A bulk density of from about 0.45 g/cc to about 0.8 g/cc in a layer of thickness of 0.3 cm to about 3.5 cm is required. This can be accomplished by weighing out the required amount of material and placing it on the requisite area of the belt. It can also be done by using a continuous feeder mechanism with mechanical fingers or spreaders to make the layer of the required thickness and density. A doctor blade may be used to transfer the agglomerate from the feeder belt to the fryer belt.

The continuous layer of agglomerated analog being fed to the fryer belt should be of a thickness of about 0.3 cm to about 3.5 cm, preferably to about 0.4 cm to about 2.5 cm. The density or packing of the product should be about 0.45 g/cc to about 0.80 g/cc. Preferably the density is 0.50 g/cc to 0.70 g/cc. The density is bulk density.

The continuous layer can have some discontinuity. The layer of agglomerate should be substantially continuous, i.e. not have many large gaps. In general, no less than 75% of the surface area of the conveyor should be covered with agglomerate.

In order to produce a particle size within the range noted above as being preferred, the wet agglomerate layer must form discrete particles on the fryer belt. In order to achieve this desired wide range of particle size distribution, control of the ratio of the belt surface speeds, the ratio of the fryer belt surface speed (heat-setting conveyor) to the feeder surface speed is in the range of about 1.1:1 to about 5:1. Preferably the ratio will be 1.1:1 to about 3:1.

By having the fryer belt move at a faster speed than the feeder belt, the agglomerate as it is placed from a continuous layer onto the fryer belt, spreads out in an uneven pattern. Thus, a wide variety of particle sizes are produced. These particles range in size from less than 1 cm to about 3 cm in diameter.

The position of the feeder belt relative to the fryer belt is not critical. The feeder belt may be at an angle to the fryer belt or horizontal with it.

The continuous fryer can be a direct fired fryer or an indirectly heated fryer. There are many models of continuous fryers available. Any of these will work so long as there is a means of controlling the continuous sheet of analog going to the fryer belt and a means of controlling the ratio of the feeder belt to fryer belt speeds.

A fryer such as that described in U.S. Pat. No. 4,372,200, issued to Cardis et al (1983) is useful herein. In FIG. 4 of this patent the feeder belt and continuous fryer belt are shown.

EXAMPLE 1

A soy protein concentrate, Procon 2000, manufactured by the A. E. Staley Company, is mixed with water to a moisture level of about 40% and worked to a dough in a Werner & Pfleiderer twin screw extruder in a manner so that strands of extrudate are formed. The dough temperature immediately prior to exit from the extruder is about 170° C. (338° F.) and the pressure is about 600 psig. As the strands of dough exit from the extruder die, they are expanded somewhat by release of steam to a diameter of about 6 mm. The extrudate strands are cut into lengths of about 1.5 cm by a rotary shear. The pieces are air conveyed to a knife impact mill with 16 blades rotating at a tip velocity of about 48 m/sec. Particles are sheared and reduced in size as they impact against a plate perforated with ⅜" square openings at the mill discharge.

This particulate extrudate is mixed with dry flavorants and then hydrated with water at about 87° C. to 93° C. (190° F. to 200° F.). The resulting slurry is cooled to about 49° C. (120° F.), mixed with egg white binder until the mixture is homogeneous and little free liquid is apparent. The finished agglomerate slurry contains by weight about 72% water, 2.6% egg white solids, 3.5% flavorants, 0.2% color, and the remainder extrudate solids.

This slurry is then formed on a moving continuous belt as a layer about 1.25 cm (½ inch) thick and about 25 cm (10 inches) wide. The belt is equipped with a doctor blade. The density is 0.61 g/cc. This layer is dropped a short distance onto a mesh belt traveling somewhat faster (ratio of belt speeds is 1.5 to 1) than the forming belt so that partially separated lumps of slurry of various sizes are formed. The moving mesh belt is immersed in the vat of a continuous fryer manufactured by HEAT & CONTROL INC. which contains vegetable fat controlled at 110° C. (230° F.). Immersion of the mat is maintained by an upper second belt of like design conveyed at the same speed as the lower belt. The space between the belts is larger than the thickness of the mat.

The analog is fried for about 3.4 minutes. The analog exiting from the fryer is in pieces of various sizes and thicknesses the smaller of which, particularly those at the edges of the mat, are browner and chewier than the larger pieces.

This analog is then drained free of excess fat and cooled. When the analog is mixed with sauce the particle size distribution is:

0% by weight on a 15.9 mm screen;
14% by weight on a 12.7 mm screen;
15% by weight on a 9.51 mm screen;
33% by weight on a 5.66 mm screen;
30% by weight through a 4.76 mm screen;
the balance on a 4.76 mm screen.

EXAMPLE 2

A slurry is formed on a moving continuous belt as a layer of about 1.5 cm thick and about 8 inches wide. This layer is dropped a short distance onto a mesh belt traveling somewhat faster. The ratio of the feeder belt to the continuous mesh belt is about 1.8:1. The partially separated lumps of slurry of various sizes are formed. The moving mesh belt is passed through radiant heat oven at a temperature of about 150° C. (302° F.) to heat-set the binder. The particular size distribution is similar to that in Example 1.

The particles can be used as is, or immersed in hot oil or fat to add additional flavoring.

EXAMPLE 3

An agglomerate is prepared according to Example 2 except that a microwave energy source is used to heat-set the agglomerate.

What is claimed is:

1. In a process for continuously forming and heat-setting moist agglomerated textured protein in the form of a particulate meat analog, the improvement comprising forming a continuous layer on a moving feeder surface as a wet slurry an agglomerate having a bulk density of about 0.45 g/cc to about 0.80 g/cc, said layer having a thickness of 0.3 cm to 3.5 cm, and then transferring the agglomerate layer by dropping said agglomerate onto a conveyor such that discrete particulates are formed and wherein said conveyor is traveling through a heat-setting zone, the ratio of the heat-setting conveyor surface speed to the feeder surface speed being from about 1.1:1 to about 5:1.

2. A process according to claim 1 wherein the continuous heat-setting is via a heat source comprising microwave energy or radiant heat.

3. A process according to claim 1 wherein the continuous heat-setting is accomplished by continuous frying.

4. A process according to claim 3 wherein the agglomerate layer has a thickness of 0.4 cm to 2.5 cm.

5. A process according to claim 4 wherein the bulk density is from 0.5 g/cc to about 0.7 g/cc.

6. A process according to claim 5 wherein the wet agglomerate has a moisture content of 60% to about 75%.

7. A process according to claim 5 wherein the agglomerate is a textured vegetable protein.

8. A process according to claim 7 wherein the particle size distribution of the fried agglomerate is
 (a) from 0% to about 2% by weight on a 15.9 mm screen;
 (b) from about 6% to about 20% by weight on a 12.7 mm screen;
 (c) from about 9% to about 18% by weight on a 9.51 mm screen;
 (d) from about 27% to about 37% by weight on a 5.66 mm screen; and
 (e) from about 25% to about 40% by weight thru a 4.76 mm screen, and
 (f) the balance on a 4.76 mm screen, provided the sum of (a) (b) (c) and (d) is from about 48% to about 72%.

9. A process according to claim 8 wherein the agglomerate is a textured vegetable protein consisting of soy protein and egg albumen binder.

10. A process according to claim 2 wherein the agglomerate is a textured vegetable protein mixed with an egg albumen binder.

11. A process according to claim 10 wherein the agglomerate layer has a thickness of about 0.4 cm to about 2.5 cm.

12. A process according to claim 11 wherein the bulk density of the agglomerate layer is from about 0.5 g/cc to about 0.7 g/cc.

13. A process according to claim 12 wherein the particle size distribution of the fried agglomerate is (a) from 0% to about 2% by weight on a 15.9 mm screen;
(b) from about 6% to about 20% by weight on a 12.7 mm screen;
(c) from about 9% to about 18% by weight on a 9.51 mm screen;
(d) from about 27% to about 37% by weight on a 5.66 mm screen; and
(e) from about 25% to about 40% by weight thru a 4.76 mm screen, and
(f) the balance on a 4.76 mm screen, provided the sum of (a) (b) (c) and (d) is from about 48% to about 72%.

* * * * *